United States Patent

Terakawa et al.

[11] Patent Number: 5,926,164
[45] Date of Patent: Jul. 20, 1999

[54] IMAGE PROCESSOR

[75] Inventors: Tomomitsu Terakawa, Aichi Pref.; Yoshihiro Naruse, Chiba Pref., both of Japan; Takeshi Ikeyama, Brighton, United Kingdom

[73] Assignees: Aisin Seiki Kabushiki Kaisha, Kariya; Kabushiki Kaisha Shinsangyokaihatsu, Tokyo, both of Japan

[21] Appl. No.: 08/751,789

[22] Filed: Nov. 18, 1996

Related U.S. Application Data

[63] Continuation of application No. 07/896,877, Jun. 10, 1992, abandoned, which is a continuation of application No. 07/415,755, Oct. 2, 1989, abandoned.

[30] Foreign Application Priority Data

Sep. 30, 1988 [JP] Japan .................................. 63-246053

[51] Int. Cl.$^6$ .................................................. G09G 5/00
[52] U.S. Cl. ........................ 345/112; 345/133; 345/185; 345/147; 345/7
[58] Field of Search ................................ 345/7, 8, 9, 112, 345/147, 185, 133; 348/73, 115, 113, 114, 118; 382/312

[56] References Cited

U.S. PATENT DOCUMENTS

| | | |
|---|---|---|
| 4,402,009 | 8/1983 | Rathjens et al. .......................... 358/125 |
| 4,551,752 | 11/1985 | Wall et al. ................................. 358/113 |
| 4,710,822 | 12/1987 | Matsunawa ................................. 382/51 |
| 4,711,544 | 12/1987 | Iino et al. .................................. 353/14 |
| 4,724,482 | 2/1988 | Duvent ...................................... 358/113 |
| 4,755,664 | 7/1988 | Holmes et al. ............................ 358/161 |
| 4,807,163 | 2/1989 | Gibbons ..................................... 382/18 |
| 4,896,279 | 1/1990 | Yoshida ..................................... 382/18 |
| 4,940,972 | 7/1990 | Mouchot et al. ......................... 340/747 |

*Primary Examiner*—Xiao Wu
*Attorney, Agent, or Firm*—Sughrue, Mion, Zinn, Macpeak & Seas, PLLC

[57] ABSTRACT

An infrared-spectrum image processor mounted in a vehicle assists a driver in seeing under difficult conditions, such as rain, smog or fog. The device operates, in part, on the principle that infrared rays are "visible" at longer distances than are light rays falling within the visible spectrum, especially when adverse visual conditions exist. Also, different objects have different images when "viewed" in the infrared spectrum. Thus, even if an image is difficult to see in the visible spectrum, if the infrared spectrum is not disturbed, it may be possible to "see" the objects anyway. In operation, the processor analyzes a histogram derived from a taken image. If the histogram shows a distribution containing two peaks, the processor determines that there is an obscure image. For mounting on a vehicle an infrared camera is mounted on the vehicle roof. A dash-mounted display is provided for transmitting the processed images to the driver to facilitate decision-making while driving.

10 Claims, 12 Drawing Sheets

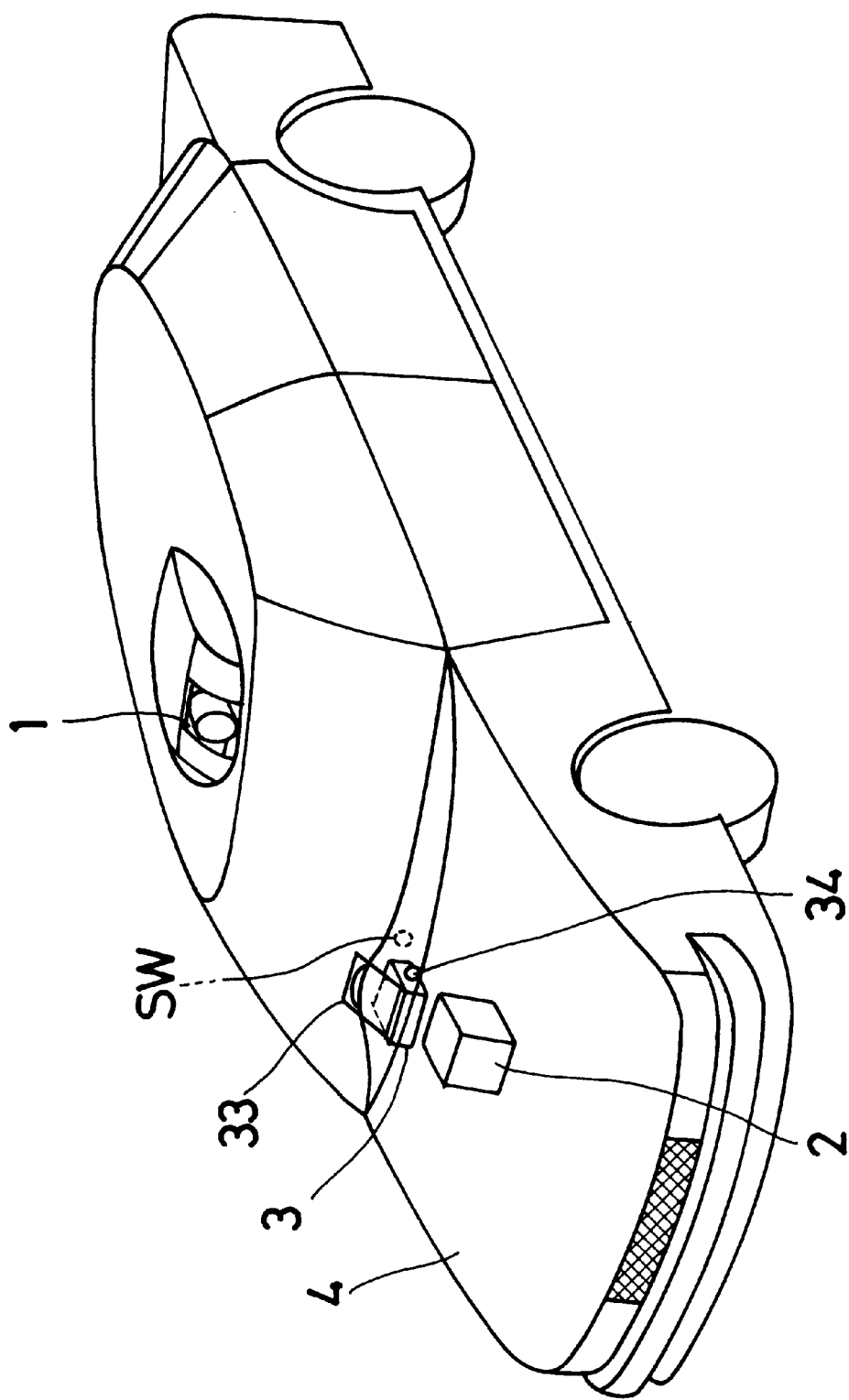

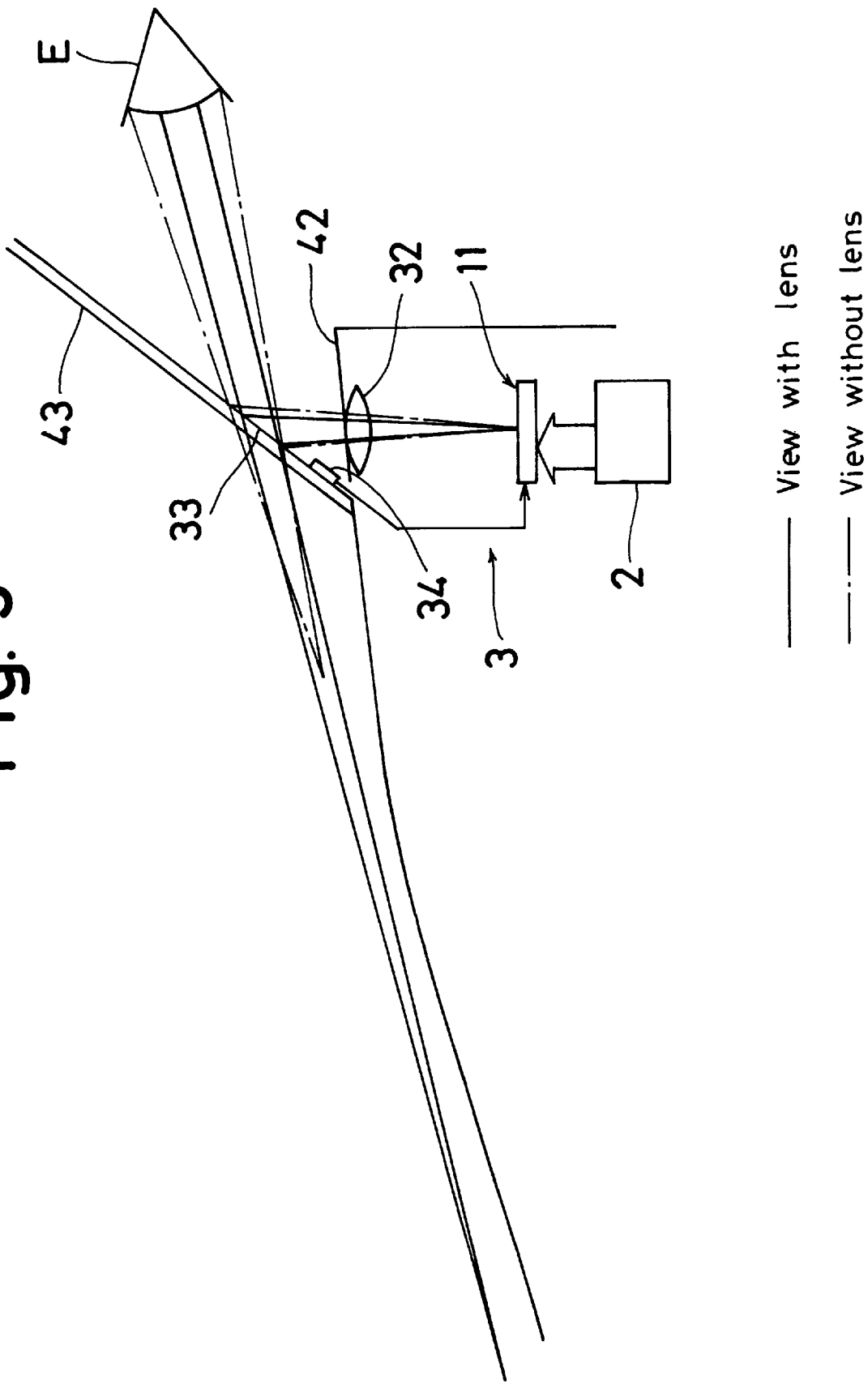

IMAGE PROCESSOR

This is a continuation of application Ser. No. 07/896,877 filed Jun. 10, 1992, now abandoned, which is a Continuation of application Ser. No. 07/415,755 filed Oct. 2, 1989, now abandoned.

BACKGROUND OF THE INVENTION

The present invention relates to an image processor, and in particular to a processor which processes two dimensional images in accordance with temperature expansions taken with infrared photography. For example, an image processor of the present invention can be used in a car for providing a supplemental view to aid the driver's view if it is obscured because of rain or fog.

In general, infrared rays having a wavelength of about 8 $\mu$m to 12 $\mu$m penetrate through rain, fog or smog farther than visible rays. It also is known that most obstacles in front of a car radiate infrared rays and have different temperatures and emissive powers which are distinct from each other. This suggests that two dimensional images in accordance with temperature expansion taken by an infrared photography can aid a driver's view in rain, fog or smog.

However, such images are not clear compared with a view provided by visible rays, because infrared rays radiated from obstacles are relatively small and are scattered by rain, fog and smog. Therefore, it is not helpful for a driver to see such images, because they will not help him or her make decisions, and driving requires constant decision-making.

SUMMARY OF THE INVENTION

Accordingly, one of the objects of the present invention is to produce an image processor to obviate the above drawbacks.

Another object of the present invention is to produce an image processor which provides a clear and distinguishable view of the image.

To achieve the above and other objects, and in accordance with the principles of the invention as embodied and broadly described herein, an image processor comprises an image data generating device for generating dot data in accordance with temperature expansions of two dimensional image area, a memory for storing the dot data, and a constant data generating device for generating a first constant and a second constant which is greater than the first constant in accordance with the following steps:
  setting a predetermined area in the dot data;
  reading dot data corresponding to the predetermined area from memory;
  calculating a histogram in accordance with density of the read dot data and number of dots;
  checking whether the histogram matches a predetermined pattern; and
  reading the lowest and highest value of the dots data.

The inventive image processor also includes a data changing device for changing the first constant with the lowest dot data and the second constant with the highest dot data, and an image display for displaying the dot data which is changed by the data changing device.

In accordance with the above-mentioned image processor, the lowest dot data is replaced with the first constant and the highest dot data is replaced with the second constant. Because a deviation of the dot data generated by the image data generating device can be expanded, the dot data generated by the image data generating device is adjusted so that the dot data is clearer. Further, this image processor calculates the first and second constants in accordance with the stored dots data in the memory so that real time processing can be achieved.

BRIEF DESCRIPTION OF THE DRAWINGS

For a full understanding of the true scope of the invention, the following detailed description should be read in conjunction with the drawings, wherein:

FIG. 2a is a view showing the view aid system shown in FIG. 1 as mounted in a car.

FIG. 2b is an enlarged view of part of FIG. 2a.

FIG. 3 is a cross sectional view of FIG. 2b.

DETAILED DESCRIPTION OF THE PREFERRED EMBODIMENTS

In the following, preferred embodiments of the present invention will be described with reference to the drawings.

Figure 1:
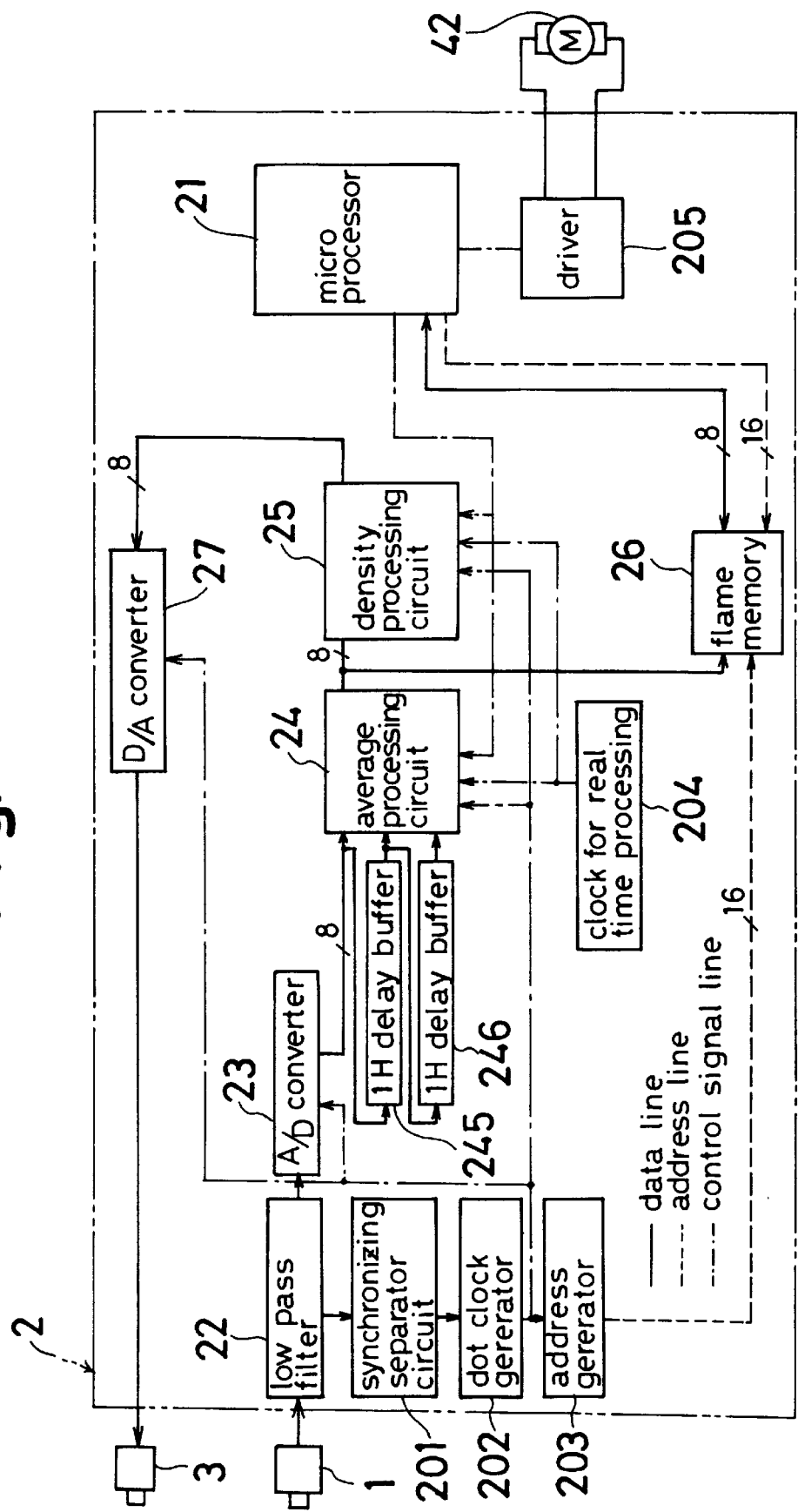
FIG. 1 is a block diagram showing a view aid system including an image processor of the present invention.

FIG. 1 shows a view aid system of the present invention.

Referring to FIG. 1, the system includes an infrared camera 1, an image processor unit 2 and a head-up display 3. The infrared camera 1 detects infrared rays having wavelengths between 8 $\mu$m and 12 $\mu$m and outputs analog data in accordance with strengths of detected infrared rays. One image is divided into 256×256 picture dots.

Figure 2B:
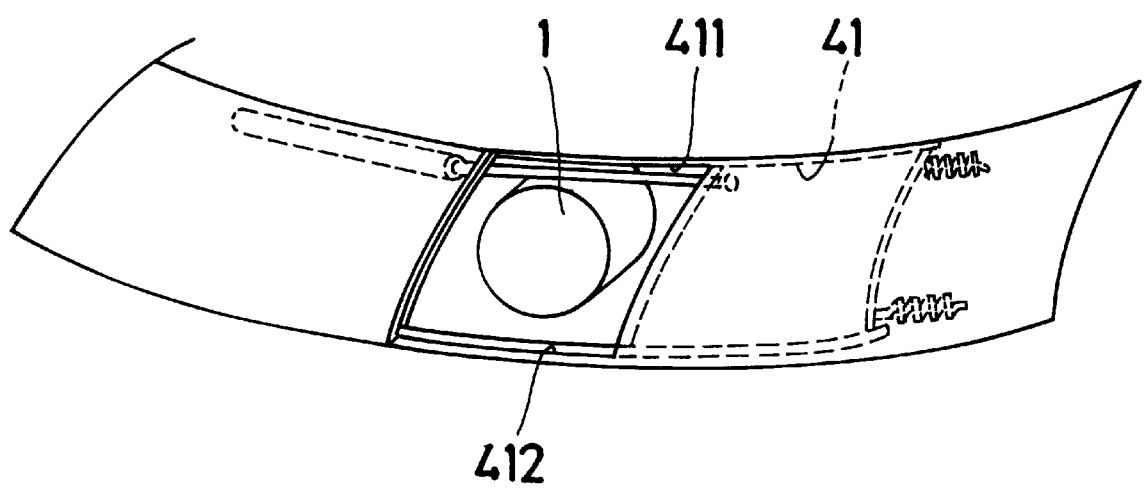

The camera 1 is mounted on a car roof 4 as shown in FIG. 2a and is placed toward the front of the car. As shown in FIG. 2b, a cover 41 is placed to protect the camera 1. The cover 41 slides on rails. A motor 411 is provided to open and close the cover 41. The image processor unit 2 is placed inside the car 4 and includes a microprocessor 21, a synchronizing separator circuit 201, dot clock generator 202 and a clock generator circuit 204 for real time processing.

The synchronizing separator circuit 201 separates a dot clock signal from a synchronizing signal in the output signals of the infrared camera 1. The picture data (analog data) of the infrared camera 1 is sent to the low pass filter 22 to cut off high frequency waves. The A/D converter 23 converts the signals from the low pass filter into 8-bit digital data (256 gradations), and then the average processing circuit 24 cuts noise in the data.

Figure 6A:
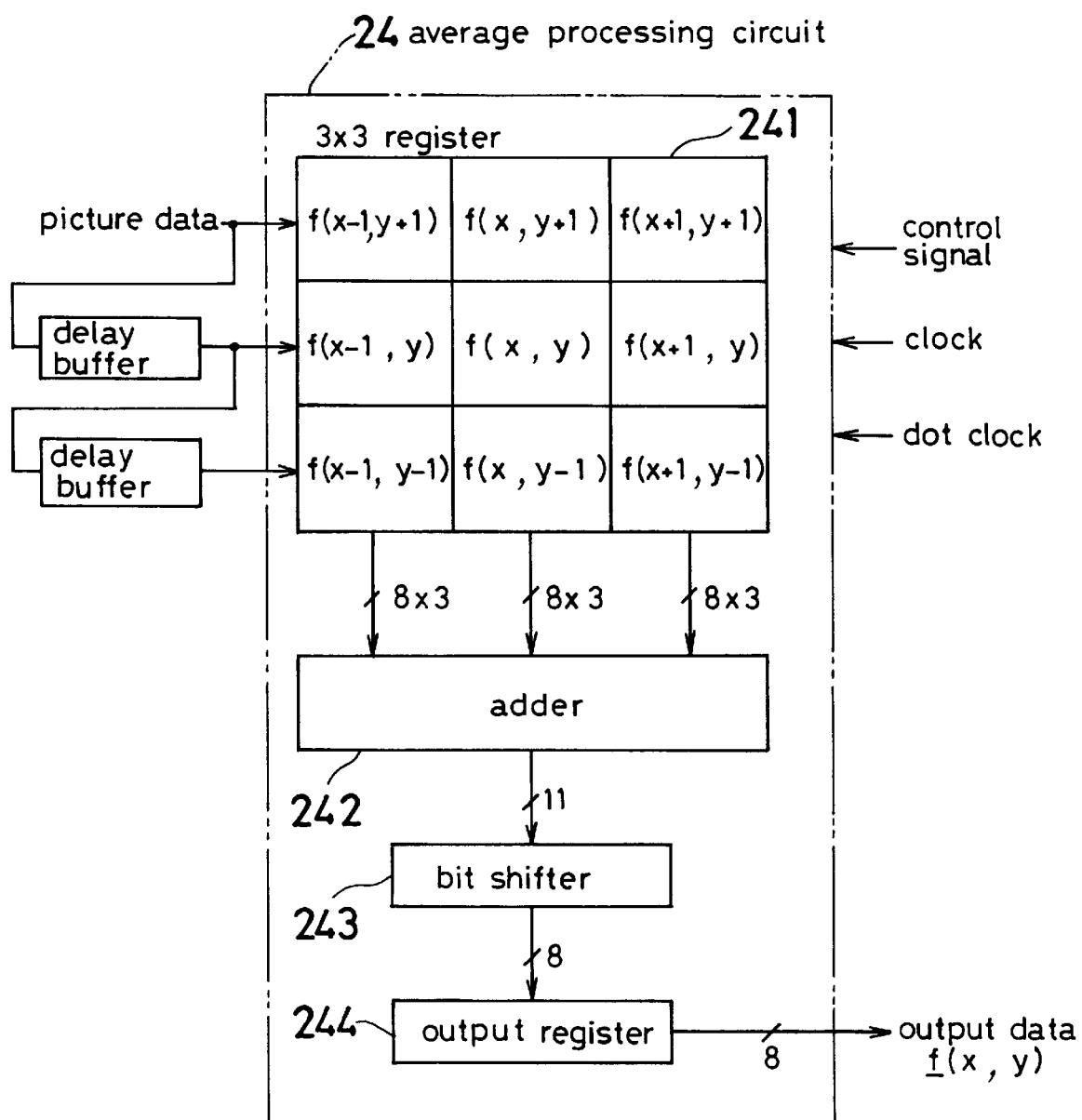
FIG. 6a is a block diagram showing the average processing circuit 24 shown in FIG. 1.

Referring to FIG. 6a, the average processing circuit 24 has a 3×3 matrix register 241, an adder 242, a bit shifter 243 and an output register 244. Two 1H delay buffers 245, 246 are connected to the average processing circuit 24. The 3×3 matrix register 241 consists of three shift registers which have serial in and parallel out ports and can store 3 elements of picture data. The picture data from the A/D converter 23 is sent to the first register of the 3×3 matrix register 241 directly. The 1H delay buffer 245 delays the picture data in 1 horizontal line and sends it to the second register of the 3×3 matrix register 241 and another delay buffer 246. The delay buffer 246 delays this signal in 1 horizontal line again and sends it to the third register of the 3×3 matrix register 241. Thus, the 3×3 matrix register 241 picks up picture data which includes 3 elements of horizontal data and 3 elements of vertical data, for a total of 9 elements of picture data in the 3×3 matrix register 241. In FIG. 6a, these picture data are shown as f(x,y), f(x−1,y+1), f(x,y+1), f(x+1,y+1), f(x−1,y), f(x+1,y), f(x−1,y−1), f(x,y−1) and f(x+1,y−1). The adder 242 calculates the sum of the data f(x−1,y+1), f(x,y+1), f(x+1,y+1), f(x−1,y), f(x+1,y), f(x−1,y−1), f(x,y−1) and f(x+1,y−1). The bit shifter 243 shifts the sum of the data to the right by 3 bits. The adder 242 and bit shifter 243 calculates a simple average of the 8 picture data. The output register 244 keeps the output data of the bit shifter 243 for a certain time and sends the data as average data f(x,y).

Figure 6B:
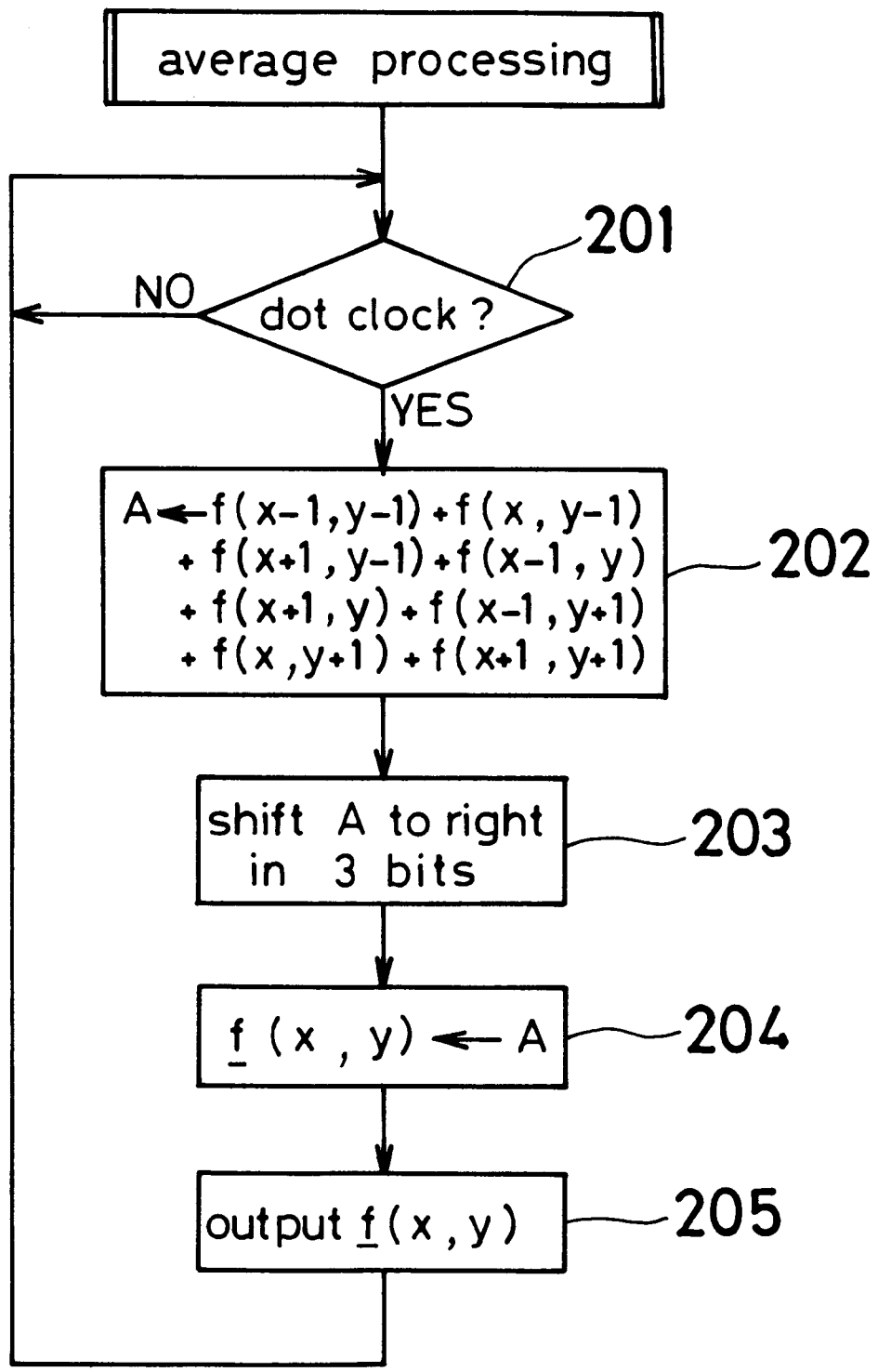
FIG. 6b is a flow chart showing an operation of the average processing circuit 24.

FIG. 6b shows a flowchart of the operation of the average processing circuit 24 as mentioned above. When dot clock appears in step 201, a sum of the 8 elements of picture data is calculated in step 202. In step 203, the sum is shifted to the right by 3 bits. Then the averaged data f(x,y) is output in a certain timing synchronized with the dot clock.

The averaged data f(x,y) is sent to the density processing circuit 25 and the frame memory 26. An address data is given to the frame memory 26 by the address generator 203 which is synchronized with the dot clock. The density processing circuit 25 emphasizes the averaged data f(x,y). FIG. 7c shows an operation of the density processing circuit 25. When the relation between the density and the number of picture dots is shown in dot line a in FIG. 7c, the density processing circuit changes the lowest density signal 1 data to 0 (zero) gradation and the highest density signal h data to 256 gradation as shown in the line b in FIG. 7c. The density data 1 data and h data are given as constant data calculated from the averaged data in the frame memory 26.

Figure 7A:
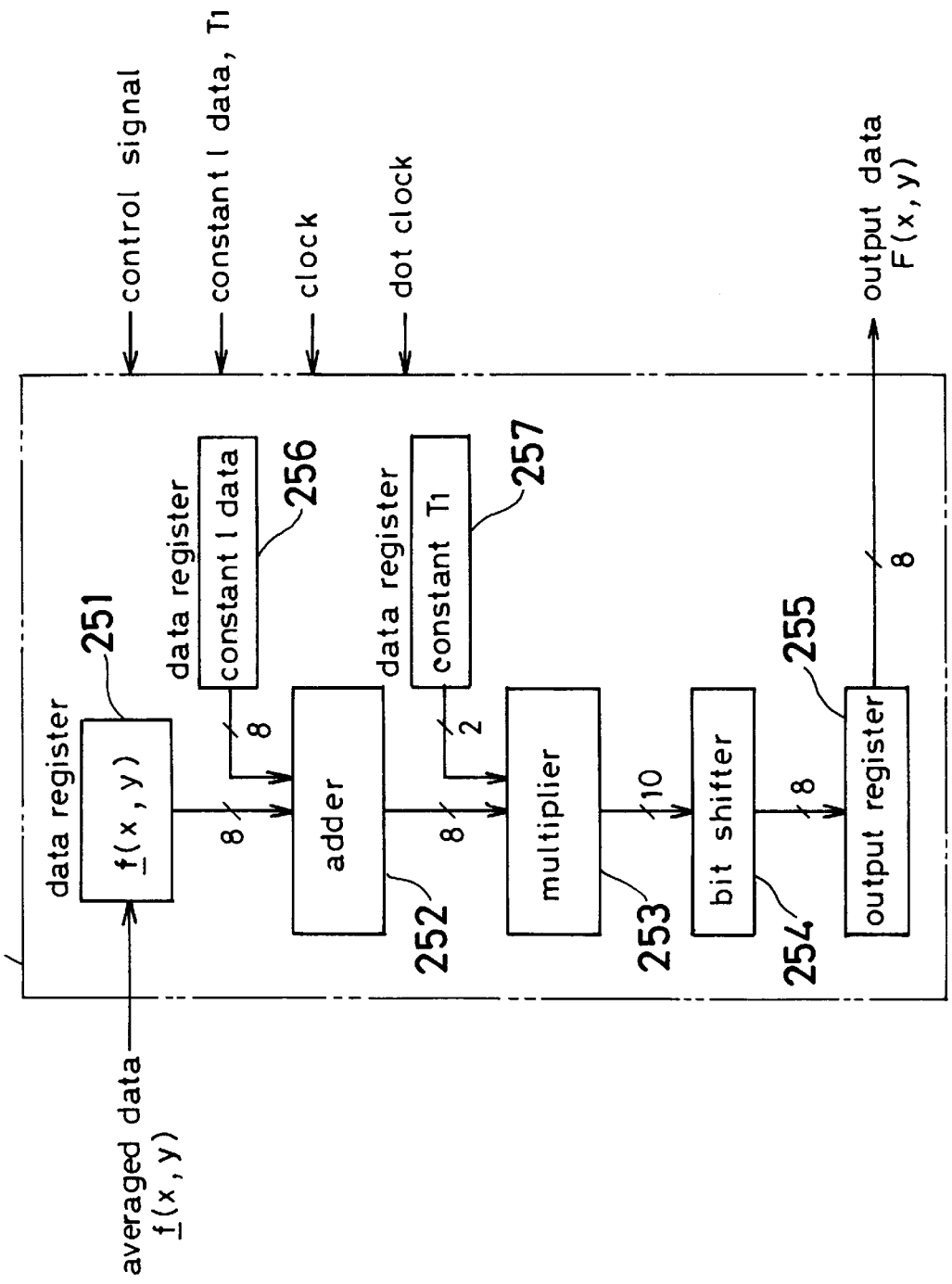
FIG. 7a is a block diagram showing the density processing circuit 25 shown in FIG. 1.

Referring to FIG. 7a, the density processing circuit 25 consists of data registers 251, 256, 257, an adder 252, an multiplier 253, a bit shifter 254, and an output register 255. The data register 251 keeps an averaged data f(x,y) of the average processing circuit 24 for a certain time. The data register 256 and 257 keep constant 1 data and a constant T1, respectively. This constant T1 is calculated by 256/(h data−1 data)×4. The multiplication by 4 is performed to eliminate the decimal numbers. The adder 252 calculates the difference between an averaged data f(x,y) in the data register 251 and a constant 1 data in the data register 256, that {f(x,y)−1 data}. If a constant 1 data is greater than an averaged data, the answer is 0 (zero). The multiplier 253 multiplies [f(x,y)−1 data} with a constant T1. The bit shifter 254 shifts an output of the multiplier 253 to the right by 2 bits in order to balance the multiplication by the constant T1. An output of the bit shifter 254 stays in the output register 255 for a certain time and outputs data F(x,y) which is emphasized in the contrast. As explained above, the density processing circuit 25 expands averaged data f(x,y) of the average processing circuit 24 to the gradients between 0 and 256.

Figure 7B:
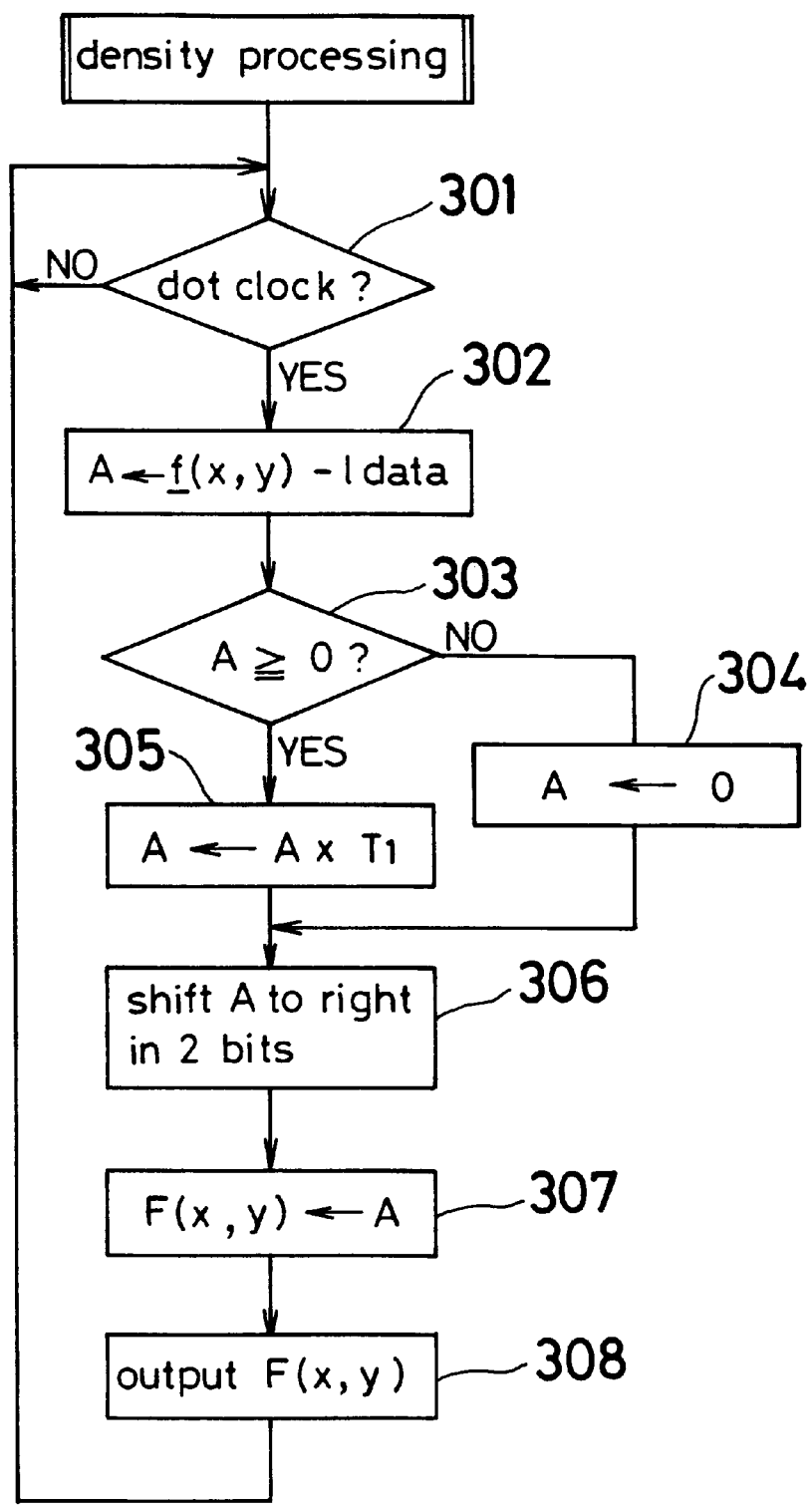
FIG. 7b is a flowchart showing an operation of the density processing circuit.
Figure 7C:
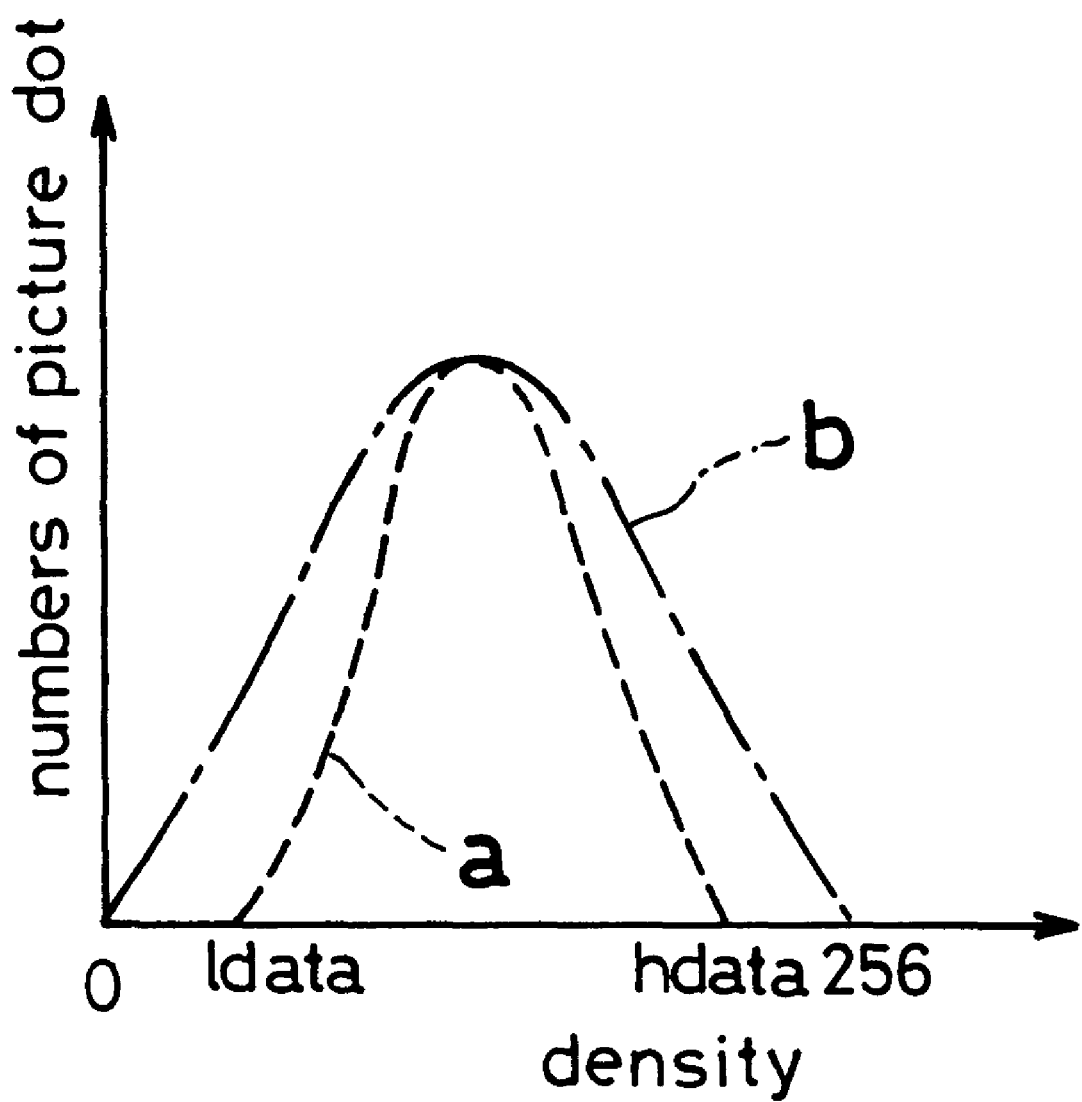

FIG. 7b is a flowchart showing the above-mentioned operations. When the dot clock is detected in the step 301, a difference between an averaged data f(x,y) and a constant 1 data is calculated in step 302. In step 303, if the difference is equal or greater than 0 (zero), the control goes to the step 305. In step 305, the difference is multiplied by a constant T1. The control shifts this data to the right by 2 bits in step 306 and outputs data F(x,y).

Data emphasized in contrast by the density processing circuit 25 is converted into analog data by the D/A converter 27 and sent to the head-up display 3.

The head-up display 3 includes a LCD 31 and lens 32 in the dashboard 42 and a half mirror 33 and an illumination sensor 34 on the shield 43. LCD 31 sends an image in color in accordance with the illumination sensor 34. The lens focuses the image on the half mirror 33. Using the known formula:

$$1/Q + 1/R = 1/F$$

wherein F is a focal length of a lens 32, Q is distance between a lens 32 and LCD 31, and R is a distance between the driver's eyes E and an image. In this embodiment, in order to reduce a driver's efforts to correct the focus, F is set to be as same as Q (F≈Q; R≈∞).

Figure 4:
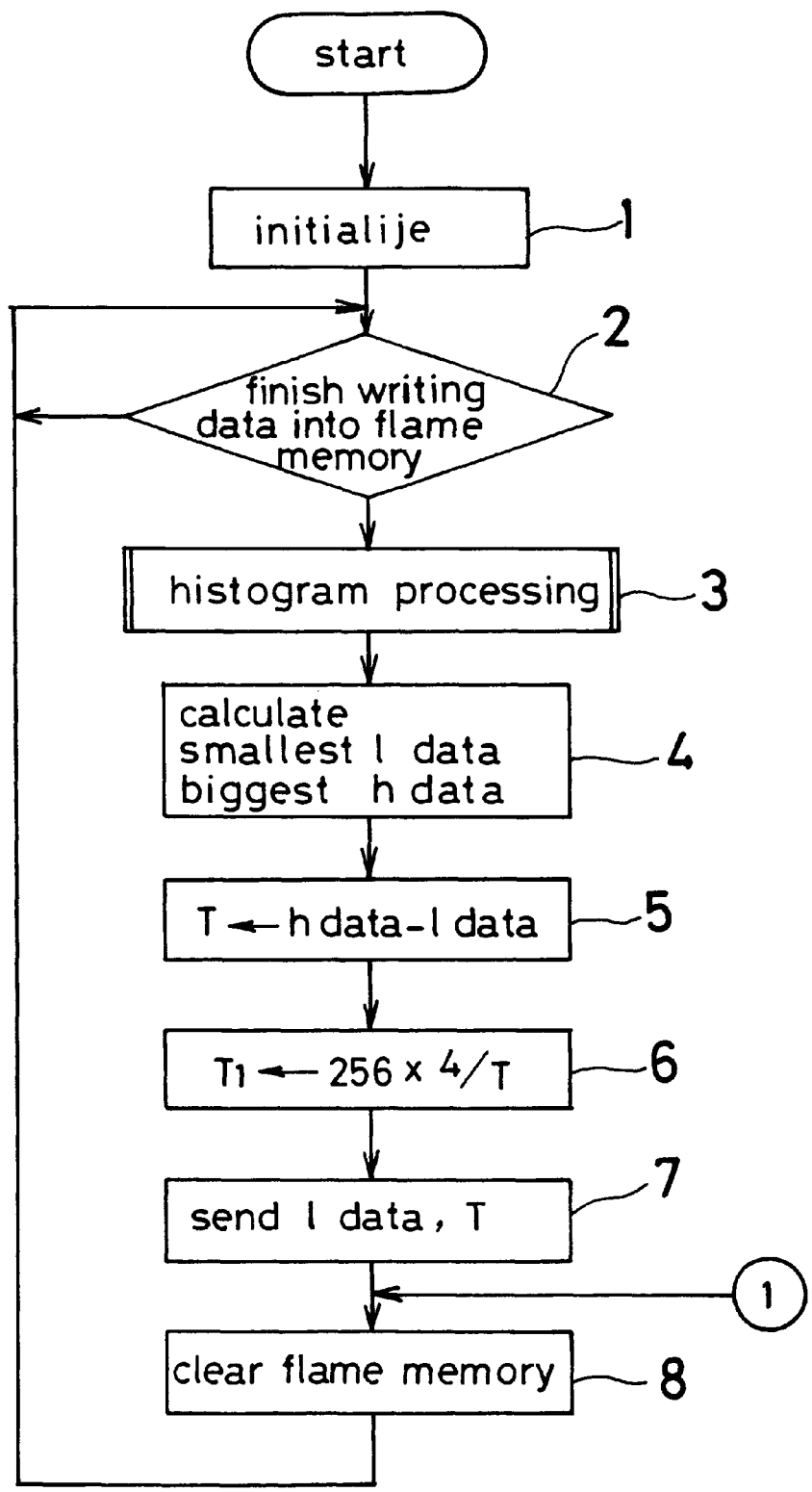
FIGS. 4 and 5a are flowcharts showing an operation of the microprocessor 21 shown in FIG. 1.

FIG. 4 is a flowchart showing an operation of the microprocessor 21. When the power is turned on, the control initializes input/output ports, registers and frame memory 26 in step 1 and then iterates through a loop including steps 2 and 8. The microprocessor 21 calculates and outputs constants 1 and T1. In step 2, the control waits for the completion of writing picture data into the frame memory 26. In step 3, the control initiates histogram processing, a flowchart for which is shown in FIG. 5a.

Figure 5A:
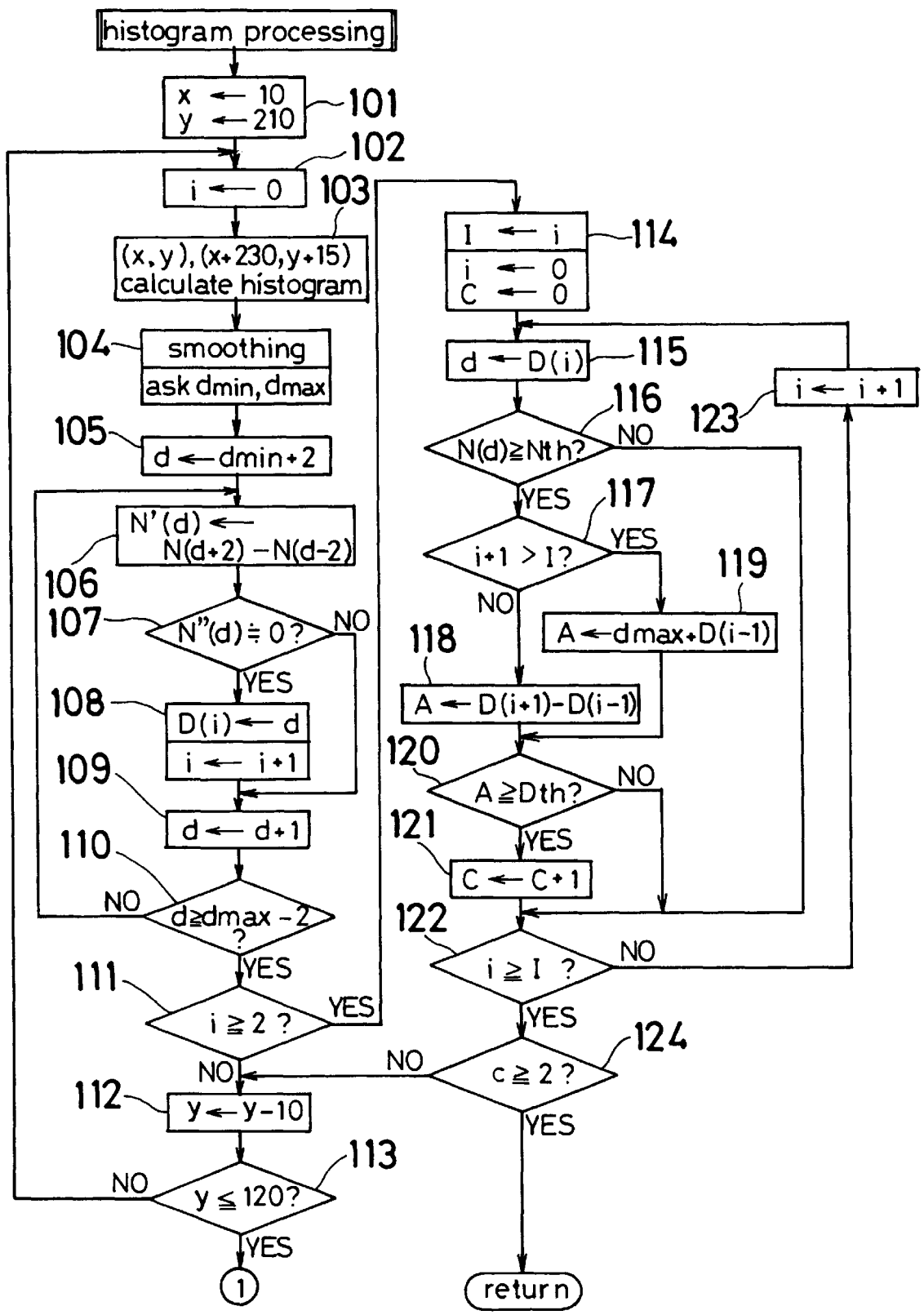
Figure 5B:
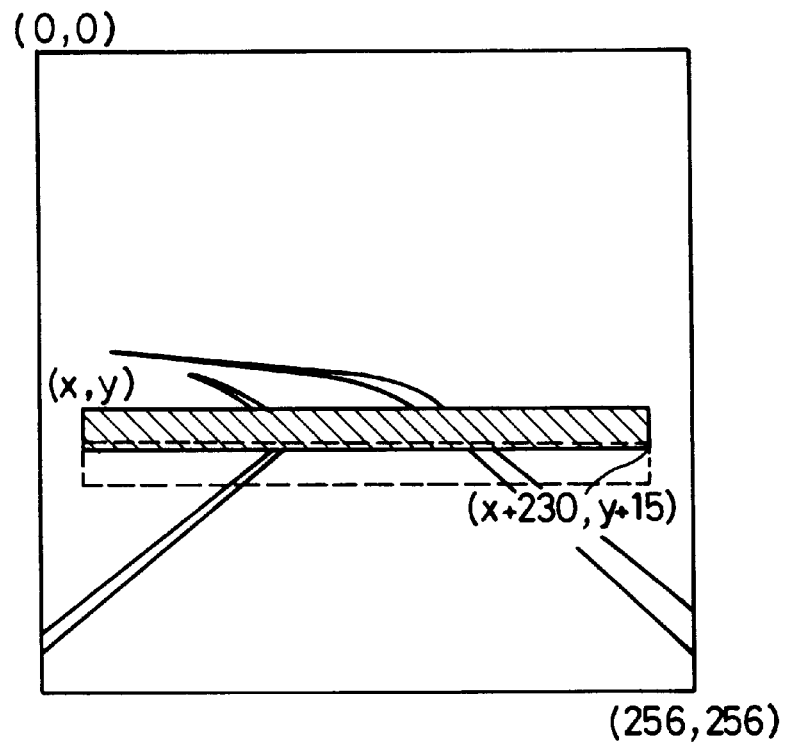
FIG. 5b is a drawing showing one example of an image processed by the microprocessor.

Referring to FIG. 5a, in step 101, coordinates x and y set as 10 and 210, respectively. The origin of coordinates is set at the corner of the 256×256 dot area as shown in FIG. 5b. The register i is cleared in step 102. In step 103, the control calculates a histogram which shows relation between the density and the number of picture dots in a square set by the coordinates (x,y) and the coordinates (x+230,y+15). In step 104, this histogram is smoothed and the lowest density d min and the highest density d max are decided. In steps 105 to 110, a pole of the histogram is calculated. In step 105, density register d is initialized to store (d min+2). In step 106, differential data N'(d) is calculated in accordance with the formula:

$$N'(d) = N(d+2) - N(d-2)$$

wherein N(d+2) is a number of picture dots when the density is (d+2), and N(d−2) is a number of picture dots when the density is (d−2). If N'(d) is zero or smaller than the predetermined value in step 107, the density d is stored in the memory D(i) and the register i is incremented in step 108. Otherwise, the step 108 is not executed. The steps 106 to 109 are continued until the value of the density register d is equal to the value (d max−2). Then the control goes to step 111.

In step 111, the value of the register i is checked. The value of the register i corresponds to the numbers of pole in the histogram. If the value i is smaller than 2, the control goes to step 112 to change the coordinate y and goes back to the step 102. If the value i is equal or greater than 2, the control goes to step 114. In step 114, the value of the register i is sent to the register I and the register i and the count register C are cleared. The control then goes into a loop including the steps 115 to 123.

In step 115, the control sets the density d by reading the memory d(i) and checks the numbers of dots N(d) in step 116. If the N(d) is greater than the set value Nth, the point shows a top of a histogram. Then the control calculates the difference between the points D(i+1) and D(i−1) in step 118 if the value i+1 is smaller than the value at the register I which corresponds with the number of poles. If the value i+1 is greater than the value at the register I, the control goes to step 119 and calculates the difference between the maximum density d max and D(i−1).

In step 120, the difference is compared with the set value Dth. If it is greater than Dth, the count register C is incremented in step 121. This control is continued until the value of the register i is equal to the value of the register I. If the value of the count register C is equal or greater than 2 in step 124, the control goes back to the main routine.

Figure 5C:
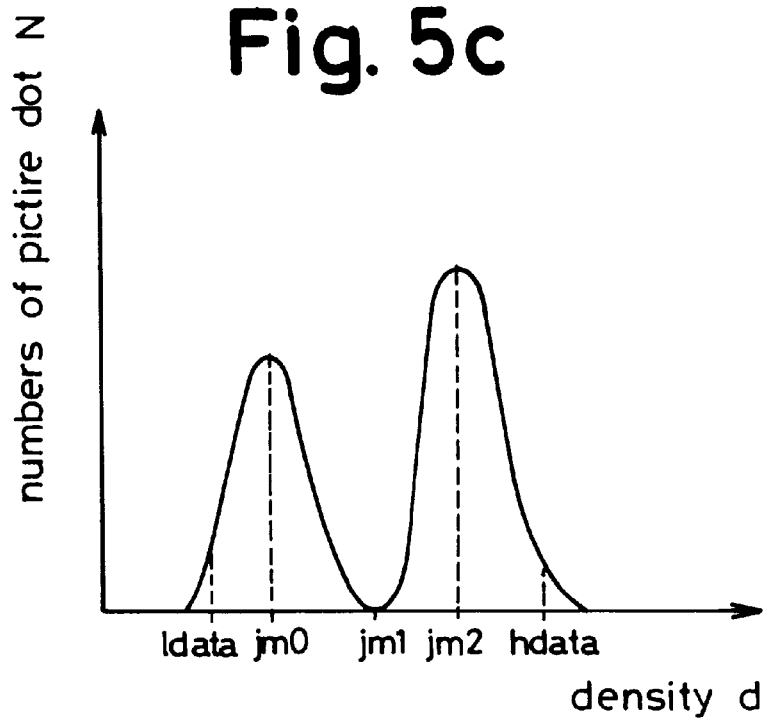
FIG. 5c is a graph showing a relation between density and number of picture dots.

As mentioned above, the histogram processing sets a 230×15 dot area in picture data and calculates the density and number of dots to make a histogram. If this histogram has at least two peaks like FIG. 5*c*, that means that area includes a vague image. If not, the control changes a dot area to move forward by 5 dots in order to find the area which has two peaks. In general, an image taken by the infrared camera includes a sky in the top and road in the bottom, so that it is easy to find the two peaks in the image. However, if y is smaller than 120 and still the control cannot find the two peaks, the control goes to step 8 in the main routine. If the proper histogram is found, the control goes back to the main routine. In step 4, the control calculates the lowest data and the highest data. The lowest value 1 data is calculated by adding 360 dots (density is higher) to the lowest density d min. The highest value h data is calculated by removing 360 dots (density is lower) from the highest density d max. In step 5, a value T is calculated T is calculated by (h data−1 data). In step 6, T1 is calculated by (256×4/T). When a constant T1 is calculated, the control sends 1 data and T1 to the density processing circuit 24. Then the control clears the frame memory in step 8.

The invention has been described in an illustrative manner, and it is to be understood that the terminology which has been used in intended to be in the nature of words of description rather than of limitation.

Obviously, many modifications and variations of the present invention are possible in light of the above teachings. Therefore, it should be understood that within the scope of the appended claims, the invention may be practiced otherwise than as specifically described.

What is claimed is:

1. An image processor for a vehicle comprising:

image data generating means for generating dot data in accordance with temperature expansions in a two dimensional image data;

memory means for storing said dot data;

defining means for defining a predetermined area within the memory means;

means for calculating a histogram of density and number of said dot data stored in the predetermined area;

checking means for checking whether said histogram matches a predetermined pattern;

means for calculating minimum and maximum density of the dot data in the predetermined area on the basis of the histogram in response to said checking means indicating that the histogram matches the predetermined pattern;

density changing means for changing the density of the dot data in the predetermined area in order to expand the density range of the histogram in such a manner that a changed minimum density corresponds to a first predetermined density which is lower than the minimum density and a changed maximum density corresponds to a second predetermined density which is higher than the maximum density; and image display means for displaying an image in accordance with the dot data changed by said density changing means.

2. An image processor as claimed in claim 1, wherein the checking means checks whether the histogram has two peaks.

3. An image processor as claimed in claim 1, wherein said predetermined area is an area which is removed from each side of the image for right and left direction.

4. An image processor as claimed in claim 1, further comprising average processing means for averaging the dot data from the memory means so as to reduce noise therein, and for outputting the averaged dot data to the density changing means.

5. An image processor as claimed in claim 1, wherein the image processor is mounted on a vehicle, wherein said image data generating means comprises an infrared camera which photographs a driver's view.

6. An image processor as claimed in claim 1, wherein the image processor is mounted on a vehicle, wherein said image display means comprises a head-up display for displaying the image on a front window shield of the vehicle.

7. An image processor as claimed in claim 1, wherein the minimum density is the density of a dot data which is a predetermined dot number larger toward the direction that the density is higher from the lowest density, and wherein the maximum density is the density of a dot data which is a predetermined dot number smaller toward the direction that the density is lower from highest density.

8. An image processor as claimed in claim 4, wherein said average processing means comprises a matrix register for receiving picture data.

9. An image processor as claimed in claim 5, wherein said average processing means further comprises an adder coupled to said matrix register, a bit shifter coupled to said adder, and an output register coupled to said bit shifter.

10. An image processor as claimed in claim 8, wherein said matrix register is a 3×3 matrix register.

\* \* \* \* \*